United States Patent
Gangadharaiah et al.

(10) Patent No.: US 11,880,335 B2
(45) Date of Patent: *Jan. 23, 2024

(54) EVENT BASED RETENTION OF READ ONLY FILES

(71) Applicant: NetApp Inc., Sunnyvale, CA (US)

(72) Inventors: Akshatha Gangadharaiah, Bangalore (IN); Balamurugan Ramajeyam, Chennai (IN); Raman Madaan, Uttar Pradesh Pin (IN); Subhash A. Sankuratripati, Playa Vista, CA (US); Aftab Ahmad Ansari, Bangalore (IN); Vaiapuri Ramasubramaniam, Karnataka (IN)

(73) Assignee: NetApp, Inc., San Jose, CA (US)

( * ) Notice: Subject to any disclaimer, the term of this patent is extended or adjusted under 35 U.S.C. 154(b) by 592 days.

This patent is subject to a terminal disclaimer.

(21) Appl. No.: 16/944,336

(22) Filed: Jul. 31, 2020

(65) Prior Publication Data

US 2020/0364181 A1 Nov. 19, 2020

Related U.S. Application Data

(63) Continuation of application No. 14/840,775, filed on Aug. 31, 2015, now Pat. No. 10,762,041.

(51) Int. Cl.
| | | |
|---|---|---|
| *G06F 16/00* | (2019.01) | |
| *G06F 16/11* | (2019.01) | |
| *G06F 16/13* | (2019.01) | |
| *G06F 16/182* | (2019.01) | |

(52) U.S. Cl.
CPC ............ *G06F 16/125* (2019.01); *G06F 16/13* (2019.01); *G06F 16/182* (2019.01)

(58) Field of Classification Search
CPC ...... G06F 16/13; G06F 16/125; G06F 16/182; G06F 16/1774; G06F 16/2343
USPC .......................................................... 707/687
See application file for complete search history.

(56) References Cited

U.S. PATENT DOCUMENTS

| | | | | |
|---|---|---|---|---|
| 7,366,834 B2 * | 4/2008 | McGovern | ............ | G06F 16/125 711/112 |
| 7,392,234 B2 * | 6/2008 | Shaath | .................. | G06F 16/125 |
| 7,467,273 B2 * | 12/2008 | Ishida | ..................... | G06F 21/80 707/999.009 |
| 7,558,839 B1 * | 7/2009 | McGovern | ......... | G11B 20/1879 360/53 |
| 7,590,807 B2 * | 9/2009 | McGovern | .............. | G06F 3/067 711/159 |
| 7,761,428 B2 * | 7/2010 | Herbst | .................. | G06F 16/125 707/661 |
| 7,831,567 B2 * | 11/2010 | Luther | ................ | G06F 16/2358 707/663 |

(Continued)

*Primary Examiner* — Mariela Reyes
*Assistant Examiner* — Rezwanul Mahmood
(74) *Attorney, Agent, or Firm* — Cooper Legal Group, LLC

(57) ABSTRACT

Systems and methods are disclosed for implementing an event based retention schedule for a read only file. When a regular file is to be converted to an event based retention read only file, an "event-retain" property may be enabled on the file allowing the feature to be implemented. Then, that file may have its permissions changed to read only. This will allow the file to be changed to a read only file without using a default retention time. Then, once the event is triggered, the retention time may be set so the file can be scheduled for automatic deletion.

20 Claims, 5 Drawing Sheets

(56) References Cited

U.S. PATENT DOCUMENTS

| | | | | |
|---|---|---|---|---|
| 7,930,493 | B1* | 4/2011 | McGovern | G06F 21/78 711/159 |
| 7,958,166 | B2* | 6/2011 | Hsu | G06F 16/181 707/821 |
| 8,122,154 | B2* | 2/2012 | Ogawa | G06F 21/725 713/400 |
| 8,145,606 | B2* | 3/2012 | Herbst | G06F 16/113 707/665 |
| 8,200,721 | B2* | 6/2012 | Hsu | G06F 16/181 707/821 |
| 8,234,317 | B1* | 7/2012 | Pogde | G06F 16/122 707/648 |
| 8,260,792 | B1* | 9/2012 | Hsu | G06F 3/0619 707/756 |
| 8,516,022 | B1* | 8/2013 | Kanteti | G06F 16/181 707/827 |
| 8,707,438 | B1* | 4/2014 | Hsu | G06F 21/335 713/192 |
| 9,514,150 | B2* | 12/2016 | Sparkes | G06F 16/181 |
| 9,639,540 | B2* | 5/2017 | Sparkes | G06F 16/125 |
| 10,078,656 | B1* | 9/2018 | Carl | G06F 16/2365 |
| 10,521,401 | B2* | 12/2019 | Madaan | G06F 16/125 |
| 10,762,041 | B2* | 9/2020 | Gangadharaiah | G06F 16/182 |
| 11,200,207 | B1* | 12/2021 | Lew | G06F 11/1451 |
| 2004/0186858 | A1 | 9/2004 | McGovern et al. | |
| 2005/0097260 | A1* | 5/2005 | McGovern | G06F 21/78 711/100 |
| 2005/0177591 | A1* | 8/2005 | Kanda | G06F 16/10 707/999.102 |
| 2005/0216534 | A1* | 9/2005 | Ikezawa | G06F 16/181 |
| 2005/0240636 | A1* | 10/2005 | Shitomi | G06F 16/181 |
| 2006/0085413 | A1* | 4/2006 | Ogawa | G06F 16/221 |
| 2006/0085487 | A1* | 4/2006 | Hara | G06F 16/181 |
| 2006/0095553 | A1* | 5/2006 | Ogawa | G06F 21/725 709/223 |
| 2006/0123232 | A1* | 6/2006 | Cannon | G06F 3/0623 713/165 |
| 2006/0126468 | A1* | 6/2006 | McGovern | G06F 21/64 369/47.1 |
| 2006/0129571 | A1* | 6/2006 | Shrader | H04L 67/146 |
| 2006/0130143 | A1* | 6/2006 | Shrader | G06F 16/9535 713/188 |
| 2006/0190925 | A1* | 8/2006 | Ishii | G06F 16/181 717/106 |
| 2007/0038857 | A1* | 2/2007 | Gosnell | G06F 16/10 713/165 |
| 2007/0043773 | A1* | 2/2007 | Tsuji | G06F 11/2094 |
| 2007/0055714 | A1 | 3/2007 | Ishii et al. | |
| 2007/0083568 | A1 | 4/2007 | McGovern et al. | |
| 2007/0118687 | A1* | 5/2007 | McGovern | G06F 21/78 711/112 |
| 2007/0174565 | A1* | 7/2007 | Merrick | G06F 16/125 711/161 |
| 2007/0179990 | A1* | 8/2007 | Zimran | G06F 16/185 |
| 2007/0271280 | A1 | 11/2007 | Chandasekaran | |
| 2007/0271573 | A1 | 11/2007 | Chandrasekaran | |
| 2008/0016132 | A1* | 1/2008 | Merhar | G06F 16/162 |
| 2008/0172563 | A1 | 7/2008 | Stokes | |
| 2008/0263108 | A1* | 10/2008 | Herbst | G06F 16/125 |
| 2008/0263297 | A1* | 10/2008 | Herbst | G06F 16/125 711/161 |
| 2008/0263565 | A1* | 10/2008 | Luther | G06F 16/2358 719/316 |
| 2009/0018996 | A1* | 1/2009 | Hunt | G06Q 30/02 |
| 2009/0019443 | A1* | 1/2009 | Jakob | G06F 11/2097 718/102 |
| 2009/0049003 | A1* | 2/2009 | Hsu | G06F 16/181 |
| 2009/0063587 | A1* | 3/2009 | Jakob | G06F 11/2094 707/999.203 |
| 2009/0125572 | A1* | 5/2009 | Cannon | G06F 16/181 |
| 2009/0164409 | A1 | 6/2009 | Mukherjee | |
| 2011/0191306 | A1* | 8/2011 | Akagawa | G06F 16/162 707/E17.005 |
| 2011/0238714 | A1* | 9/2011 | Hsu | G06F 16/181 707/821 |
| 2012/0109985 | A1* | 5/2012 | Chandrasekaran | G06F 16/24544 707/754 |
| 2012/0185444 | A1* | 7/2012 | Sparkes | G06F 11/0727 707/689 |
| 2012/0221811 | A1* | 8/2012 | Sparkes | G06F 16/125 711/E12.001 |
| 2014/0317157 | A1* | 10/2014 | Sparkes | G06F 16/181 707/822 |
| 2016/0283501 | A1* | 9/2016 | König | G06F 16/11 |
| 2016/0292168 | A1* | 10/2016 | Ramesh | G06F 16/137 |
| 2017/0052972 | A1* | 2/2017 | Karuppusamy | G06F 11/1004 |
| 2017/0060885 | A1* | 3/2017 | Gangadharaiah | G06F 16/125 |
| 2017/0060897 | A1* | 3/2017 | Madaan | G06F 16/125 |
| 2017/0091057 | A1* | 3/2017 | Ramasubramaniam | G06F 11/2071 |
| 2018/0189301 | A1* | 7/2018 | Kannan | G06F 16/113 |
| 2018/0267980 | A1 | 9/2018 | Neria et al. | |
| 2018/0336210 | A1* | 11/2018 | Bourgeois | G06F 3/0604 |
| 2019/0034295 | A1* | 1/2019 | Bourgeois | G06F 16/125 |
| 2020/0364181 | A1* | 11/2020 | Gangadharaiah | G06F 16/125 |

* cited by examiner

EVENT BASED RETENTION OF READ ONLY FILES

RELATED APPLICATIONS

This application claims priority to and is a continuation of U.S. application Ser. No. 14/840,775, filed on Aug. 31, 2015, now allowed, titled "EVENT BASED RETENTION OF READ ONLY FILES," which is incorporated herein by reference.

FIELD

The disclosure relates to data storage systems having write-once-read-many capabilities for enhanced data integrity.

BACKGROUND

The following description includes information that may be useful in understanding the present disclosure. It is not an admission that any of the information provided herein is prior art or relevant to the presently claimed invention, or that any publication specifically or implicitly referenced is prior art.

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a direct connection or computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks.

As used herein, the term "storage operating system" generally refers to the computer-executable code operable on a computer that manages data access and may, in the case of a filer, implement file system semantics, such as a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

Data storage is an increasingly crucial and central part of many industries dealing in financial transactions and other sensitive tasks, such as banks, government facilities/contractors, defense, health care institutions, pharmaceutical companies and securities brokerages. In many of these environments, it is necessary to store selected data in an immutable and unalterable manner. This need continues to grow in the light of current concerns over institutional fraud and mismanagement, wherein the temptation on the part of wrongdoers to erase or alter incriminating data is always present. Forms of data that require immutable treatment often include e-mails, financial documents and transaction records, and any other record that may act as proof of an important action or decision. Even in less-critical/unregulated environments, the ability to store a secure unalterable data cache is highly desirable. For example engineering, medical, law and other professional firms may wish to establish a cache of key data (e.g. invention reports or design files, client communications, medical images, etc.), that will remain unaltered and online for long periods on time. These caches can provide reliable references and proofs for clients and other interested parties.

For an example of a highly regulated environment, the United States Securities and Exchange Commission (SEC)—the body that regulates all securities transactions and reporting relative to public corporations—promulgates SEC Rule17 a-4 governing document retention for brokers and investment institutions. This rule requires that these entities store e-mails and other documents in connection with a variety of transactions and trades by clients of the entities unchanged and unchangeable for a number of years and to be able to provide these records to the SEC and other regulators on short notice. Failure to comply with these rules can lead to significant sanctions.

A variety of prior art approaches involving tape drives, electro-optical recordable media and the like have been employed over the years to implement a WORM storage system. Each of these systems has certain drawbacks in terms of storage size, speed maintenance requirements or a combination of these (and other) factors.

In the above-incorporated-by-reference U.S. patent application Ser. No. 10/391,245 entitled WRITE-ONCE-READ-MANY STORAGE SYSTEM AND METHOD FOR IMPLEMENTING THE SAME, a particularly advantageous approach to WORM storage is taught, which employs conventional fault-tolerant (e.g. RAID-based) disk storage (or similar rewritable media) as a platform for a WORM storage system. This described system is advantageous in that such disks are large in storage capacity, relatively inexpensive and easily added to an existing storage implementation. However, these disks are also inherently rewritable and/or erasable, in light of existing operating systems and protocols that are typically designed with semantics that specifically enable the free rewriting and erasure of attached disks. The described WORM storage approach is, therefore, specially configured to absolutely prevent alteration of any WORM-designated data. Also, to maintain longevity of the solution and make it available to as many clients as possible, the described WORM implementation utilizes open protocols such as CIFS and NFS and requires minimal alteration to these protocols or the applications that employ them and a minimal footprint on client applications. The system is, thus, organized around WORM storage volumes that contain files, which when committed to WORM storage, cannot be deleted or modified. Any file path or directory tree structure used to identify the file within the WORM volume is locked and cannot be deleted.

In the described WORM system, an administrator creates a WORM volume (or other WORM-designated data organizational structure), capable of storing designated WORM files (or other "data sets"). The client then creates an appropriate WORM file using the appropriate protocol semantics. The file is written to the volume and committed to WORM state by transitioning the file attributes from a not-read-only state to a read-only state. The file system persistently stores the WORM state of a file with the attributes and metadata for the file and uses this persistent WORM state to recognize WORM files on a WORM volume. Henceforth, any attempt to modify the file attributes, write to the file, or delete the file, by clients, administrators or other entities is rejected and a request denied message is returned to the attempting party. Since the file cannot be deleted, conventional file system semantics prevent deletion of the directory path. Likewise, the file system does not permit renaming of directories in an illustrative embodiment to thereby ensure the reliable and immutable identification of WORM files within the directory structure.

Committing of the WORM file to the WORM storage volume can be performed by the client via a command line interface in an interactive manner. Alternatively, applications, which are familiar with the WORM semantics, can be adapted to commit the file using an appropriate application program interface or other programmatic command structure. Similarly, open protocols, such as NFS or CIFS, through which the clients communicate with the file server/file system can be modified to enable automatic commit of created files upon a key event, such as closing of the file. The protocols and file system can be adapted to enable specialized WORM directories within the volume. An appropriate WORM file extension can be provided so that worm files within the volume can be readily identified by the client. Also, selected mirroring and backup functions may be allowed, while other backup functions that enable restoration or reversion of the volume to an earlier point in time may be disabled.

Many regulatory schemes governing WORM data storage (for example SEC 240.17a-4) specify provisions for retention periods, after which the WORM data can be discarded. In the absence of a specified retention period, applied to the record on creation, the regulations generally specify permanent retention. In the case of removable media, such as tapes or electro-optical storage, the media are carefully indexed and stored (often in secure sites) during their retention periods. Upon expiration of an applicable retention date, the expired media is retrieved from storage and physically destroyed. Since disk storage has the inherent ability to be rewritten and reused when a particular record is no longer needed, it is contemplated that the WORM protection on various on-disk records may carry a retention date, and when the retention date passes, the expired WORM record and associated data may be erased, thus preserving storage resources and ensuring the orderly and predictable removal of expired WORM data-without the material waste evoked by physical media destruction.

One commercially available WORM storage system marketed under the trade name Centera from EMC Corp. of Hopkinton, Mass. enables basic forms of retention dates for record storage. The system utilizes a network-connected cluster of general-purpose computer systems running a customized variant of the Linux operating system. A proprietary application programming interface (API) and proprietary protocols for interfacing with the storage system, as opposed to the open protocol and open standardized API approach is implemented by these computers. As such, applications can only access the storage and manipulate records through proprietary mechanisms or through a "gateway" interposed between the users and the storage system, which translates an open protocol to the proprietary protocols supported by the storage system.

This form of WORM storage system utilizes, so-called "Content Addressable Storage," (CAS) for management of stored records. CAS relies on computing digital signatures, using an algorithm such as an MD5 hash, of the contents of any WORM-stored records to create a unique key (of "content address") for each and every record. A representation of the digital signature of a record is used as the "key," or "content address," with which any future reference to the stored object must be made. This is often described as similar to a "claim check" system whereby the storage system generates a unique key for every object stored, which it returns to the application. The application is responsible for management and preservation of these content addresses, which must be performed external to the storage system.

To associate retention information with a stored record, the proprietary API permits metadata, in a proprietary format, to be associated with a stored object. This metadata information can include retention information for the record. The API supports the ability to extend retention dates further into the future, and in certain configurations, to assign an infinite retention date to those records submitted without retention information. Because of the CAS architecture, every object written to the system, as long as it has unique contents, is stored as a unique object with a unique content address. To enable WORM functionality the API prevents deletion of objects prior to the expiration of their associated retention period. Modification of existing objects is impossible because any changes in the contents of an object will result in a new content address, and hence a new object being created in the storage system.

To track retention time and other time-dependent functions, this system is believed to simply draw time values from the system hardware clocks within the nodes (computers) of the cluster for time reference and rely on the physical security of the system to prevent tampering.

Other systems provide a specified retention date within a data set that is locked against deletion or modification within a WORM storage implementation. This retention date scheme does not utilize any proprietary application program interfaces (APIs) or protocols, but rather, employs native functionality within conventional file (or other data containers, data sets or block-based logical unit numbers) properties available in commonly used operating systems. In an illustrative embodiment, the retention date/time is calculated by querying the file's last-modified time prior to commit, adding the retention period to this value and thereby deriving a retention date after which the file can be released from WORM. Prior to commit, the computed retention date is stored in the file's "last access time" property/attribute field, or another metadata field (typically open protocol-based) that remains permanently associated with the file and that, in being used for retention date, does not interfere with file management in a WORM state. Since this field is non-essential and rarely utilized in a WORM context, it can be adapted to store this date. Once stored, the retention date in this field is locked against modification. Where extension (never reduction) of a retention period is desired, the last access time field be updated, wherein the retention period extension is added to the existing last access time value to derive a new, later retention date for the file. Upon expiry of the retention date, the system allows deletion of the expired WORM file/data set.

The procedure checks whether the retention date provided by the administrator, user or interface is allowed by a particular set of WORM rules governing a volume. To this end, there may be more than one set of WORM rules applicable to a storage system. For storage requiring strict (government regulatory, for example) compliance, a strict or regulatory WORM volume may be employed. Storage in this volume is subjected to strict minimum default retention periods or, in the absence of a specified period, infinite periods. No modification or deletion of files is permitted until an applicable retention date expires. Conversely an "enterprise" volume, defined under a trusted administrator model may permit flexible setting of retention dates and/or no date as a default. Likewise, enterprise volumes may enable restoration from an earlier image of the file/volume, or destruction of a volume where appropriate.

In an illustrative embodiment, a secure compliance clock is used to gauge the time relative to the retention period. In one embodiment, this clock uses a trusted timebase, such as a repetitive file server process to derive its time value. The clock is tamper-proof, and its time value is guaranteed to be no sooner that actual time, but may be slightly longer to further ensure observance of the full retention period. In other embodiments, the clock can be based upon a trusted third-party clock (such as a government-based clock) or an additional secure hardware-based clock.

The stored retention date/time can overcome certain limitations in bit range for older open protocols by providing a base time date (epoch) that is relatively contemporary with the present day. The available date range under such bit range limitations can be extended generally by redefining the epoch (base time) to which the time value is relative. The identical format is used for dates within the epoch while wrap-around encoding of the date (e.g. using dates before the epoch as an extended range) for values appearing within the extended date range.

WORM Volume Creation

WORM volume creation is typically implemented by the administrator using the administrative console and interface to input the appropriate volume create command. The file system is modified to recognize a new semantic relative to the conventional (pre-WORM) volume create command that designates a WORM volume. The administrator initially creates the WORM volume having some general parameters such as for size in terms of number of disks. In one embodiment this is accomplished by typing in the following exemplary command including the volume name "volname" and the "−L", the number of disks:

vol create <volname>−L<number of disks>.

Next, the volume is assigned the requested name (volname) on the file server. As such, it is identified as /vol/volname. The disks that are associated with the volume are marked with a WORM attribute on their RAID labels in persistent storage so that they are identified as WORM volumes. This may require a modification of the conventional RAID layer structure to account for this added label. While WORM is enforced primarily at the file system layer, this tag serves both to identify the assigned disk as a WORM store. Here, the WORM designation is stored in non-volatile memory in the persistent label of a WORM disk. The label contains identification information regarding the disk that permits the storage operating system to map the disk to particular volumes, and is stored in a standardized location on the disks (for example, the beginning). In this manner, the WORM designation is maintained on the disk itself containing the WORM file. Additionally, the WORM designation can be stored in NVRAM or other persistent/battery-backup memory structures and to prevent the inadvertent or deliberate destruction of the volume.

Deletion of Read Only Files

Accordingly, when a file is committed to WORM, it cannot be altered or deleted by applications, users, or administrators until the file retention date is reached. The exception is that some users may have the permission (e.g., administrative access), that allows that user only to a delete a file prior to it reaching its date scheduled for deletion (e.g., retention date). In some systems, this may be called a "privileged delete" feature.

The data that is committed to read only state generally cannot be changed or deleted before its retention date. However, one can change or delete the empty directories and files that are not committed to a WORM state on many file storage systems. Directories do not behave any differently than they would on regular volumes or files, with the exception that usually in file management systems, they cannot be renamed or moved once created. Generally, it may be a requirement for regulatory compliance that WORM data is not only non-erasable and non-rewritable, but it must also be locked down in the same location at which it was created. In the case of WORM implementation, this means that the directory path to WORM files must be locked down and should never change.

Generally, however, after the retention date is reached the WORM file is converted to a WORM expired file, and can be deleted by any users or by a software process. In some systems, the retention date on a WORM file is set when the file is committed to the WORM state, but it can be extended at any time. The retention period generally cannot be shortened for any WORM file.

Event Based Retention

Event based retention refers to retaining a record based on the occurrence of an event. This means that a record can only be deleted once an event occurs or a certain amount of time after an event occurs. For example, if the retention period of an insurance contract is set for Date of the Insured's Death plus 10 years, the event is triggered when the insured dies. For example, if the Insured Dies on 5 Mar. 2010, the contract must be retained until 4 Mar. 2020 and can only be deleted on or after 5 Mar. 2020.

Data storage management systems generally do not have a native ability to classify a file as an event based retention WORM file. Rather, a user must assign a retention period of infinity to a file prior to committing to the WORM state. Accordingly, those files are committed to a WORM state with a retention date of infinity, so they cannot be deleted at any time by a normal user. Then, once the event occurs and/or the relevant amount of time elapses, a privileged access delete feature or its equivalent must be used to delete the record at the appropriate time.

For example: If the retention period of the contract is set for Date of the Insured's Death plus 10 years and the insured dies on 5 Mar. 2010, the event is captured and examined by the application. The application infers that the contract needs to be retained for 10 years and flags the contract to be deleted, using privileged delete, on 5 Mar. 2020. If nothing occurs until 5 Mar. 2020, the application deletes the contract on 5 Mar. 2020. However if a legal hold is put on the contract on 15 Aug. 2016, the application captures this information and infers that the contract should not be deleted on 4 Mar. 2020 but rather it should be deleted when the legal hold is removed. The legal hold is removed on 11 Jan. 2021, and the application simply deletes the contract using the privileged delete feature.

In some WORM file systems, in order to set a file as a WORM file, normally a retention time (e.g., "set atime") must be specified prior to setting the file as a WORM file. If it is not, the retention time of the new WORM file will be set to the default retention time of that volume. Accordingly, with this system, to set an event based retention file, the "set atime" must be set to infinity. Then, once the event occurs, the file must be flagged for deletion at a certain time. Finally, since the file's retention time is set to infinity, a privileged delete feature must be utilized to delete the volume when it is flagged for deletion.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

Figure 1:
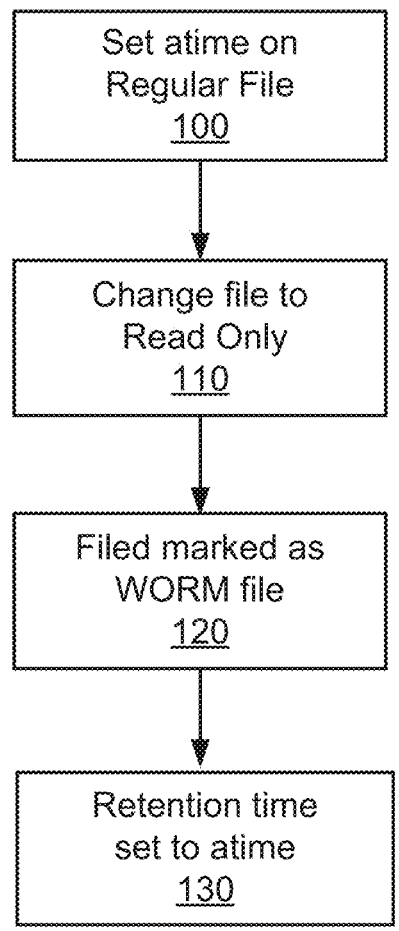
FIG. 1 depicts, in accordance with various embodiments of the present invention, a flow chart representing the process for making a file a WORM file with a set retention time.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced.

DETAILED DESCRIPTION

Unless defined otherwise, technical and scientific terms used herein have the same meaning as commonly understood by one of ordinary skill in the art to which this invention belongs. One skilled in the art will recognize many methods and materials similar or equivalent to those described herein, which could be used in the practice of the present invention. Indeed, the present invention is in no way limited to the methods and materials specifically described.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Overview

The following disclosure summarizes various embodiments of how a WORM file or a file that is changed to the status of read only, may be later set for deletion at a specific time after an event. Present file management systems have options for implementation of tools for converting files to WORM files, but the nature of a WORM file (its restricted access) prevents the files from being changed later. Therefore, currently, there is no easy way to change the deletion date of a file, other than increase it, after it has already been converted into a read only file. Therefore, there is no automatic way to set the deletion date of a WORM file after an event has occurred that starts a clock.

Accordingly, the files either must be manually deleted on the retention date using a privileged delete feature, or the user must develop a customized API to automatically delete the file on the retention date using privileged delete. Accordingly, a process for setting files to event based retention that are WORM files is needed that does not require an API to use the privilege delete features. In some embodiments, this process will work at least with NFS and CIFS clients.

Therefore, in some embodiments, when a regular file is to be converted to an event based retention WORM file, the following methods and systems may be utilized. First, an "event-retain" property may be enabled on the data volume allowing the feature to be implemented. Then, a file that is to be an event retained WORM file may have its permissions changed to read only. This will enable the file to be turned into a WORM file, without triggering a default retention time, or setting the time to infinity. In existing data management systems, once the file is changed to a WORM file the retention date cannot be changed, other than increased, as part of the protection procedures. However, according to the present embodiment, once the event is triggered, the "set a-time" or other function to set the retention time may be used to set the time for automatic deletion.

Accordingly, the retention time may be set after the file has already been committed to deletion protection as a WORM file. Once the event is triggered, and the retention time is set (e.g. by the set atime command) then the file will be deleted after the specified retention time or on the specified date.

Setting and Employing Retention Dates on WORM Files

A retention period may be set in connection with a WORM file (or other data set/data container). This retention period basically sets a file attribute before commit of the file to WORM that causes the system to observe all WORM properties described above (no deletion, modification, etc.) for the WORM file during the applicable retention period, but after expiration of the period allows the user to perform a limited set of non-WORM actions on the now-expired WORM file. Namely, the expired WORM file may be deleted from the WORM volume, thereby freeing space for new storage.

Either the administrator or user interactively sets a retention date using a client-based interface or other utility as described above, or the appropriate application sets the date based upon predetermined rules. The utility determines whether the retention period falls within an acceptable range. As described below, the period may be limited based upon the number of bits available in a given attribute. In addition, a minimum retention date may be specified. Assuming the period falls within the acceptable range, then the period is accepted. If the user or administrator opts for no period or the period is not a valid one, this is interpreted by the utility as a default value retention period. The nature of this default value may depend upon a variety of factors. For example, where the WORM volume is based upon an "enterprise" model with a relatively trusted administrator, the default may be set to an arbitrarily defined value, or an infinite value or zero (no retention period), as appropriate. Similarly, where the default is based upon a strict regulatory regime, there may be a minimum or infinite retention period, defined by the applicable rules and practice, assigned to the file by default. Note that, where an infinite value is defined, a particular bitcode is written in the property or attribute to signify an indefinite retention period, such as zero.

Once a retention period is chosen (finite or infinite), a procedure computes the time value to be observed in determining the data at which the file is to be released from WORM. This entails adding the retention period time (for example, "retain file for 10 years") to the last modified time, and thereby deriving a future release date for the file.

This computed retention date/time value is then applied to the last access time property or attribute in the file. This attribute is also rarely, if ever, used in a WORM context, and even in a non-worm context, is not particularly critical. For example, in a Windows® environment, the majority of files are accessed each time the system is booted, making this attribute less informative for actual "access" of a given file. Accordingly, the last access time property/attribute is used by the WORM utility as the vehicle to store the critical retention date bitcode (if any).

Having applied a retention date into the last access time field, the file can now be made immutable. Accordingly the read-only attribute us set as described above, causing the WORM utility to refuse any further modifications to the file. Likewise, the file's attributes/properties including last access time are fixed. In this manner the future retention date is fixed in the last access time field, and made immutable.

There are circumstances in which the retention period must be extended after initially setting it. For example, if a file or record destined for expiration becomes a subject of an investigation it may need to be retained indefinitely beyond the normal expiration date. Accordingly, the WORM utility includes provision for a limited modification of the committed WORM file's properties to account for the extension of a retention period.

FIG. 1 is a flow chart showing an example of a process for setting a file (e.g, a data structure, data container) to be a read only (e.g., WORM) file that includes setting a custom retention time/date by the example command. In this example, the command "set atime" will be used as the command for both making a file a read only file and setting the retention date. First, the "set atime" command is run on the regular file 100. This changes the file to read only 110, which marks the file as a WORM file 120. In this example, because the "set atime" command was run prior to changing the file to read only, the retention time will be set to the time set by the command "set atime." As described above, this time could be a number of days, minutes, hours, a certain date or a certain date calculated by a length of time.

Figure 2:
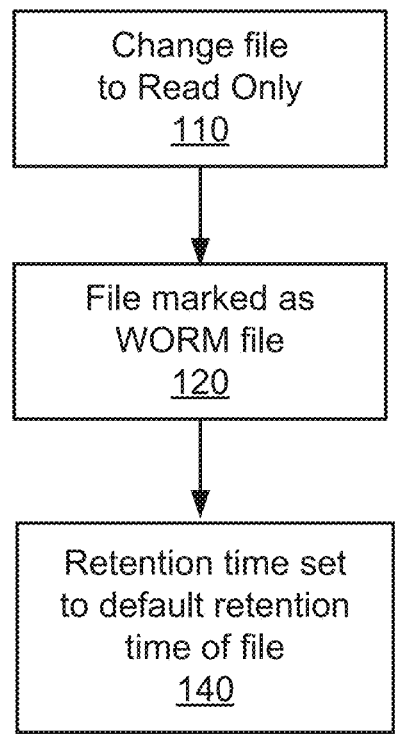
FIG. 2 depicts, in accordance with various embodiments of the present invention, a flow chart representing the process for making a file a WORM file without a set retention time.

FIG. 2 is a flow chart showing a prior art process for setting a file to be a read only (e.g. WORM file) without setting a custom retention time. First, the file is changed to a read only file 110 without first initiating the "set atime" command as in FIG. 1. In this example, once the file is set to read only, the file is marked as a WORM file 120 as well. However, the retention time is set to the default retention time of the file 140 or volume of which it is associated. This is because, in this example, the retention time was not customized initially by initiating the "set atime" command. Accordingly, in the prior art processes, if a retention time is not customized prior to marking a file as read only (e.g. WORM), then the retention time would automatically be set as the default retention time.

Therefore, there have been no processes available for setting a file that is already read only, to delete after the expiration of a certain tine. Prior to the presently disclosed systems and processes, a file that was to be event-retain would have to follow the process of FIG. 1, and set the "atime" to infinity. Then, once an event was triggered that started the retention clock (e.g., death of the insured), the file would have to be flagged for deletion by the privileged delete command. Accordingly, the existing processes did not include a function for deleting the file automatically upon expiration of the retention period. Accordingly, the files either must be manually deleted on the retention date using a privileged delete feature, or the user must develop a customized API to automatically delete the file on the retention date using privileged delete. Accordingly, a process for setting files to event based retention that are WORM files is needed that does not require an API to use the privilege delete features. In some embodiments, this process will work at least with NFS and CIFS clients and the entire workflow may be triggered from an NFS/CIFS client.

Figure 3:
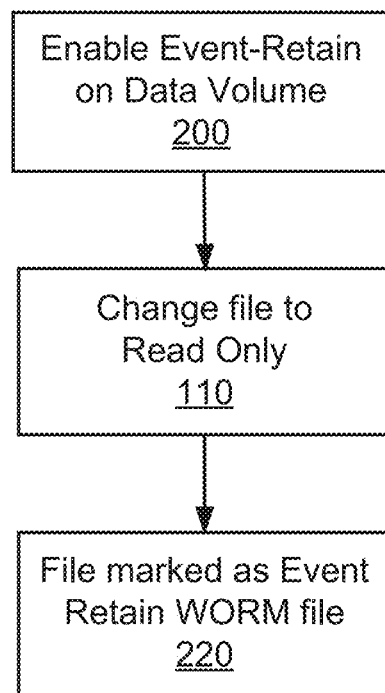
FIG. 3 depicts, in accordance with various embodiments of the present invention, a flow chart representing the process for making a file an event-based retention WORM file.

FIG. 3 is a flow chart illustrating an embodiment of a process for converting a file to read only, without setting the retention time. First, an event-retain feature can be enabled on a data volume 200. Then, the file can be transitioned to Read Only 110 which results in the file being marked as an event retain WORM file 220. In this example, because the file has been converted to an event-retain data volume, when the file is converted to read only, a default retention time is not set. This is in contrast to FIG. 2, wherein setting a file to Read Only 110 without setting a customized retention time would result in the file having the default retention time automatically set. In that case, the file could not be used as an event retain because the event has not been triggered, and therefore the expiration date of the file is not known.

Accordingly, the read-only attribute is set as described above, causing the WORM utility to refuse any further modifications to the file, except for setting of the retention date. Accordingly, the event-retain file is still protected from normal modifications, including deletion, but can only be modified by adding a retention date. Likewise, the file's attributes/properties except, for example, the last access time or other field for adding the retention time, are now fixed. In this manner, the future retention date is fixed in the last access time field, and made immutable.

Specifically, Once the WORM functionality is in operation, the restrictions it imposes are present. In one embodiment these restrictions can include:

1. WORM disables the volume destroy command—no WORM volume destruction permitted so that a WORM volume is immutable.

2. WORM disables conventional restoration of WORM volume or parts thereof from a snapshot—prevents improper reconstruction from an earlier point-in-time image that obliterates later modifications to files and WORM files committed after the point-in-time.

3. Permissions (Set Attributes command "SETATTR" in NFS) (Set File Information "TRANS2_SET_FILE_INFORMATION" command in CIFS) require that any file (or data container) within the volume be a WORM file if it is set to "read-only" from an initial not-read-only—state the file system layer distills all permissions from their respective protocols to cause WORM state to be assigned to files which undergo this not-read-only to read-only transition.

4. Any WORM file modifications (e.g. write, rename, delete, file attribute change, etc.) within the volume that modify the state of the file, including attempted modification of date stamps, read-only status, etc. are restricted. If file access/modification is requested the file system first checks the WORM state of the volume and then the target file's individual WORM state (described below) is checked before modification is permitted. If the file is WORM, then the modification is restricted, and the file server returns an appropriate file error message such as "read-only" or "access-denied" denying the modification request.

More specifically, in an exemplary CIFS environment, conventional file attributes can include: the hidden file flag, read-only flag, archive flag (set before backup performed but after writing to file), creation timestamp, modification timestamp, access timestamp, access control lists (ACLs) and NT streams. These attributes are typically locked against modification where such modification may allow improper changes to a file. Note that the modification timestamp becomes set to the creation timestamp once the file is fully committed to WORM storage. However, in an event retain WORM file that does not yet have a retention date, the modification timestamp may remain unaltered or not set.

In the NFS example, conventional file attributes that are locked can include access control and other permissions related to the file owner, group, etc. NFSv4 has many similar attributes to be locked to those in CIFS described above.

5. Directory renaming is not permitted in a WORM volume in one embodiment. This prevents the directory from being altered to potentially misplace a WORM file. It is contemplated, in an alternate embodiment, that directory renaming is allowed as long as the renaming does not misplace any WORM files, however, in many instances, the basic rule of preventing directory renaming in a WORM volume reduces overhead and increases performance by eliminating the need to check for the displacement of any WORM files in a directory tree whenever a directory renaming command is entered.

6. Directory deletion is not permitted where a WORM file is present.

Figure 4:
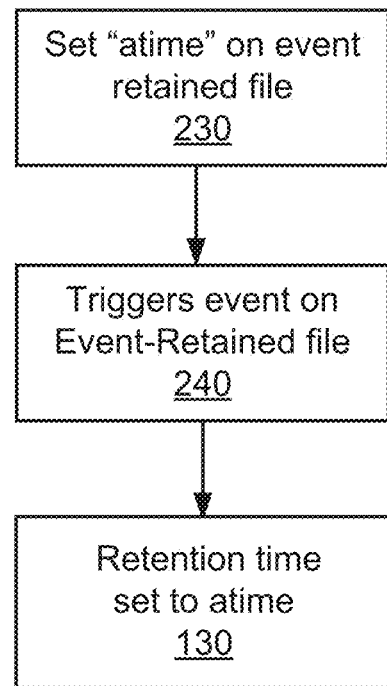
FIG. 4 depicts, in accordance with various embodiments of the present invention, a flow chart representing the process for setting the retention time on an event-based retention WORM file after the event is triggered.

FIG. 4 is a flow chart showing an example of the processes for setting the retention date for a file already marked as an Event Retain WORM file 220 by the process of FIG. 3. In this example, upon the occurrence of the event (e.g., death of the Insured) that is to trigger the retention period, the "set atime" command may be performed on an event retain read only file 230. Accordingly, the set atime command can be used to set the appropriate retention period for automatic deletion, even though the file is already a read only file. Therefore, despite the write and delete protection already applied, a retention time may be set for the file.

Once a retention period is chosen (finite or infinite), a procedures computes the time value to be observed in determining the data at which the file is to be released from WORM. This entails adding the retention period time (for example, "retain file for 10 years") to the last modified time, and thereby deriving a future release date for the file.

This computed retention date/time value is then applied to the last access time property or other attribute in the file. This attribute is also rarely, if ever, used in a WORM context, and even in a non-worm context, is not particularly critical. For example, in a Windows® environment, the majority of files are accessed each time the system is booted, making this attribute less informative for actual "access" of a given file. Accordingly, the last access time property/attribute is used by the WORM utility as the vehicle to store the critical retention date bitcode (if any).

Having applied a retention date into the last access time field, that field can now be made immutable. In this manner the future retention date is fixed in the last access time field, and made immutable.

Deletion of Expired WORM Files

Accordingly, once the atime expires or the atime is reached, the file will be automatically deleted. Alternatively, once the atime expires, the user can extend the retention-period of the file, or the user can change the expired WORM file from read-only to read-write and delete the file (with file delete/file remove command).

When a client attempts to manually delete a given file, or an appropriate application daemon process sweeps the volume to find and delete files, the system must determine whether the retention date for a given file has expired and deletion thereof is permitted. For instance, a user or administrator either requests action on a subject worm file (such as deletion), or an application daemon scans the file for possible deletion. At this point, the WORM utility queries the last access time attribute for the subject file. This is stored and the compliance clock is queried for the trusted date/time.

If the retention date is not greater than or equal to the clock date (or some minimum future date after the clock date for further skew protection), then the requestor is prevented from taking any action on the file. Naturally, where an indefinite retention date is set, it is never less than the clock date and action is never permitted by the utility. Additionally, where a retention date has not been set, as in the case of an event retain WORM file where the date has not been set, the system application will determine that the file has not expired.

Conversely, where the retention date is less than or equal to the compliance clock date (or clock date plus a "safety" margin), then the user or administrator is permitted to take limited action on the file, or action is automatically taken. In an illustrative embodiment, that action is typically limited only to deletion of the file from the volume, however other file-handling options may be permitted for an enterprise model WORM implementation. In this manner, other actions that may tamper with the integrity of the file while leaving it intact are still prevented. Typically the read only-attribute that committed the file to WORM is retained while, in combination with an expired date enables a return to the limited file permission of deletion. The utility thus places only a deletion permission on the expired WORM file.

As described above, a client can implement an automatic deletion of expired-retention-date files via operation of an application daemon or similar utility. In general, use of a compliance or trusted clock to provide a reliable reference to expiration of retention dates facilitates an automatic deletion process. That is, the deletion can occur in an "automatic" manner based upon periodic scans of the volume to locate expired files—those with retention dates greater than or equal to a trusted clock time. To this end, a recent trusted clock time can be stored in system memory and compared to the time in each file to locate the expired ones. Alternatively, the retention date of each file can be read and then a current clock time can be retrieved and compared. Deletion can occur on each file in turn after expiration is confirmed, or all expired files can be identified by the scan and deleted thereafter in a batch process. These files are then deleted by the application using appropriate file management scripts. While the daemon describe herein typically runs on the client, it is expressly contemplated that an automatic deletion process, based upon a trusted clock can be implemented on either the client side, the file server side or both.

As should be clear from the above description, the creation of event retain WORM volumes as well as the storage of event retain WORM files (data containers) according to this embodiment requires minimal alteration to the open protocols (CIFS, NFS, etc.), and similarly, minimal alteration of specific applications using the WORM functionality. This is because the majority of new functionality is contained within the file system layer, and that file system layer is adapted to recognize simple modifications to volume-create commands and preexisting file attribute transitions (i.e. not-read-only to read-only) to implement WORM within the file system layer. In addition, since the file system layer is largely independent the various open protocols and passes the information on to the storage layer with uniform WORM characteristics, minimal modifications must be made at the storage layer or other layers within the storage operating system. This avoids the necessity of using a privileged delete feature to delete items that are flagged for deletion on a certain date.

Note that in an alternate embodiment, the WORM filer or file server described herein can be implemented as a multi-protocol storage appliance and the resident storage operating system can be implemented as a virtualization system with virtualization modules embodied as a virtual disk ("vdisk") module and a SCSI target module (not shown). The vdisk module is layered on the file system to enable access by administrative interfaces, such as a streamlined user interface (UI), in response to a system administrator issuing commands to the multi-protocol storage appliance. In essence, the vdisk module manages SAN deployments by, among other things, implementing a comprehensive set of vdisk logical unit number (lun) commands issued through the UI by a system administrator. These vdisk commands are converted to primitive file system operations ("primitives") that interact with the file system and the SCSI target module to implement the vdisks. This multi-protocol storage appliance arrangement is described in further detail in commonly owned U.S. Pat. No. 7,107,385, issued on Sep. 12, 2006, entitled STORAGE VIRTUALIZATION BY LAYERING VIRTUAL DISK OBJECTS ON A FILE SYSTEM, the teachings of which are expressly incorporated herein by reference. Since a lun can be represented in the storage system as a file, it is expressly contemplated that the various permissions and attributes that ascribe a WORM state to a file and allow it to have a set retention date can be applied to a lun structure.

Figure 5:
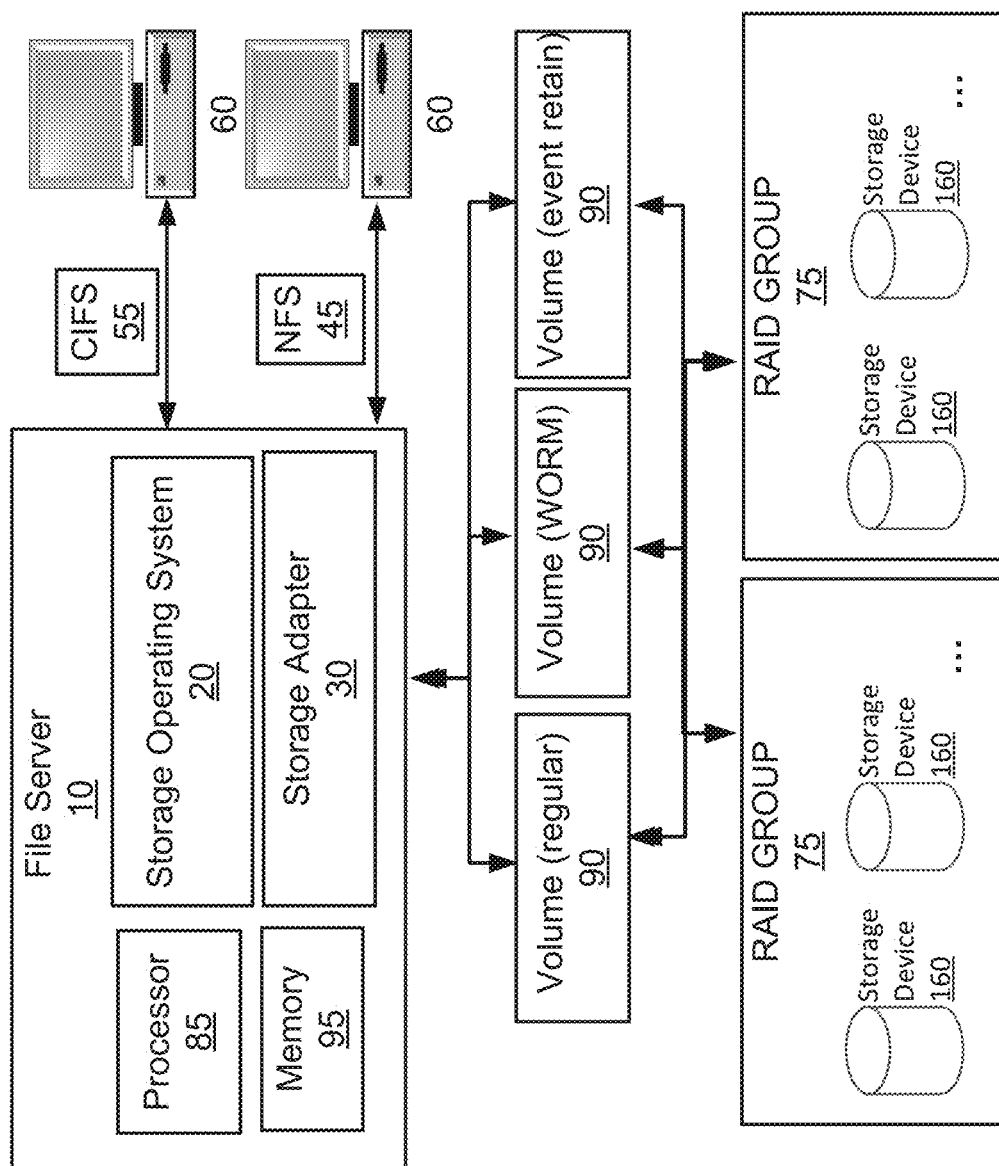
FIG. 5 depicts, in accordance with various embodiments of the present invention, a diagram representing a storage system.

FIG. 5 illustrates an overview of an example of a storage system according to the present disclosure. The storage system may include a non-volatile storage such as a Redundant Array of Independent Disks (e.g., RAID system), one or more hard drives, one or more flash drives and/or one or more arrays. The storage system may be communicatively coupled to the host device as a Network Attached Storage (NAS) device, a Storage Area Network (SAN) device, and/or as a Direct Attached Storage (DAS) device.

In some embodiments, the storage system includes a file server 10 that administers a storage system. The file server 10 generally includes a storage adapter 30 and a storage operating system 20. The storage operating system 20 may be any suitable storage system to access and store data on a RAID or similar storage configuration such as the Data On TAP operating system available from NetApp, Inc.

The storage adaptor 30 is interfaced with the RAID group 50 or other mass storage hardware component. The RAID group includes storage devices 160. Examples of storage devices 160 include hard disk drives, non-volatile memories (e.g., flash memories), and tape drives. The storage adaptor 30 accesses data requested by clients 60 based at least partially on instructions from the operating system 20.

Each client 60 may interact with the file server 10 in accordance with a client/server model of information delivery. That is, clients 60 may request the services of the file server 10, and the file server 10 may return the results of the services requested by clients 60 by exchanging packets encapsulating, for example, Transmission Control Protocol (TCP)/Internet Protocol (IP) or another network protocol (e.g., Common Internet File System (CIFS) 55 and Network Files System (NFS) 45 format.

The storage operating system 20 that implements a file system to logically organize data as a hierarchical structure of directories and files. The files (e.g. volumes 90) or other data batches may in some embodiments, be grouped together and either grouped in the same location or be allowed to be distributed in different physical locations on the physical storage devices 160. In some embodiments, the volumes 90 will be regular volumes, be dedicated WORM volumes 90, or be event-retain volumes 90.

It will be understood to those skilled in the art that the techniques described herein may apply to any type of special-purpose computer (e.g., file serving appliance) or general-purpose computer, including a standalone computer, embodied as a storage system. To that end, the filer can be broadly, and alternatively, referred to as a storage system.

The teachings of this disclosure can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory comprises storage locations that are addressable by the processor and adapters for storing software program code. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The storage operating system, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

Similarly while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present invention, but merely be understood to illustrate one example implementation thereof.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

CONCLUSION

The various methods and techniques described above provide a number of ways to carry out the invention. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Certain embodiments of this application are described herein. Variations on those embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

The invention claimed is:

1. A method comprising:

transitioning a data structure to a write once read many (WORM) state to create an event-retained data structure comprising a data field within which a retention end date, of a retention period for which the data structure is to be retained in the WORM state, is to be subsequently stored upon occurrence of a first event, wherein the data structure is transitioned to the WORM state before the retention end date is stored within the data field when the first event occurs;

blocking, before the retention end date is stored within the data field, modifications to the event-retained data structure while in the WORM state other than modifications that store the retention end date into the data field;

monitoring a data source to determine whether monitored data matches an attribute, identified from an evaluation of the data structure, indicative of the first event occurring;

triggering the retention of the event-retained data structure for the retention period based upon the monitored data matching the attribute at a point in time based upon the event occurring, wherein the event-retained data structure is retained in the WORM state until the retention end date calculated based upon the point in time as a starting date and the retention period, wherein the occurrence of the first event triggers an override of the data field to comprise the retention end date; and in response to a second event occurring, deleting the event-retained data structure before expiration of the retention period.

2. The method of claim 1, comprising:
restricting modification of the data field to the retention end date for a threshold time span after transitioning the data structure to the event-retained data structure.

3. The method of claim 1, comprising:
defining the retention end date as a default retention end date based upon the retention period being outside an acceptable time range.

4. The method of claim 1, comprising:
replacing a value within the data field of the event-retained data structure with the retention end date based upon the event occurring.

5. The method of claim 1, wherein the event-retained data structure is protected from being deleted while no retention end date is stored within the data field.

6. The method of claim 1, comprising:
extending the retention end date to a future date based upon a determination that the retention end date is earlier than a trusted clock date.

7. The method of claim 3, comprising:
determining the acceptable time range for the retention end date based upon a number of bits of the data field.

8. A computing device, comprising:
a memory comprising instructions for performing a method; and
a processor coupled to the memory, the processor configured to execute the instructions to cause the processor to:
transition a data structure to a write once read many (WORM) state to create an event-retained data structure comprising a data field within which a retention end date, of a retention period for which the data structure is to be retained in the WORM state, is to be subsequently stored upon occurrence of a first event, wherein the data structure is transitioned to the WORM state before the retention end date is stored within the data field when the first event occurs;
block, before the retention end date is stored within the data field, modifications to the event-retained data structure while in the WORM state other than modifications that store the retention end date into the data field;
monitor a data source to determine whether monitored data matches an attribute, identified from an evaluation of the data structure, indicative of the first event occurring;
trigger the retention of the event-retained data structure for the retention period based upon the monitored data matching the attribute at a point in time based upon the event occurring, wherein the event-retained data structure is retained in the WORM state until the retention end date calculated based upon the point in time as a starting date and the retention period, wherein the occurrence of the first event triggers an override of the data field to comprise the retention end date; and
in response to a second event occurring, delete the event-retained data structure before expiration of the retention period.

9. The computing device of claim 8, wherein the instructions cause the processor to:
restrict modification of the data field to the retention end date for a threshold time span after transitioning the data structure to the event-retained data structure.

10. The computing device of claim 8, wherein the instructions cause the processor to:
define the retention end date as a default retention end date based upon the retention period being outside an acceptable time range.

11. The computing device of claim 8, wherein the instructions cause the processor to:
replace a value within the data field of the event-retained data structure with the retention end date based upon the event occurring.

12. A non-transitory computer-readable storage medium having stored thereon instructions for performing a method, which when executed by a machine, causes the machine to:
transition a data structure to a write once read many (WORM) state to create an event-retained data structure comprising a data field within which a retention end date of a retention period for which the data structure is to be retained in the WORM state is to be subsequently stored upon occurrence of a first event, wherein the data structure is transitioned to the WORM state before the retention end date is stored within the data field when the first event occurs;
block, before the retention end date is stored within the data field, modifications to the event-retained data structure while in the WORM state other than modifications that store the retention end date into the data field;
monitor a data source to determine whether monitored data matches an attribute, identified from an evaluation of the data structure, indicative of the first event occurring;
trigger the retention of the event-retained data structure for the retention period based upon the monitored data matching the attribute at a point in time based upon the event occurring, wherein the event-retained data structure is retained in the WORM state until the retention end date calculated based upon the point in time as a starting date and the retention period, wherein the occurrence of the first event triggers an override of the data field to comprise the retention end date; and
in response to a second event occurring, deleting the event-retained data structure before expiration of the retention period.

13. The non-transitory computer-readable storage medium of claim 12, wherein the instructions cause the machine to:
restrict modification of the data field to the retention end date for a threshold time span.

14. The non-transitory computer-readable storage medium of claim 12, wherein the instructions cause the machine to:
define the retention end date as a default retention end date based upon the retention period being outside an acceptable time range.

15. The non-transitory computer-readable storage medium of claim 12, wherein the instructions cause the machine to:
replace a value within the data field of the event-retained data structure with the retention end date.

16. The non-transitory computer-readable storage medium of claim 14, wherein the instructions cause the machine to:
   determine the default retention end date based upon whether the event-retained data structure is stored within a WORM volume managed by an administrator having a level of trust above a threshold.

17. The non-transitory computer-readable storage medium of claim 14, wherein the instructions cause the machine to:
   determine the default retention end date based upon a rule specified by a regulatory regime.

18. The non-transitory computer-readable storage medium of claim 14, wherein the instructions cause the machine to:
   modify the data field with a zero value based upon the default retention end date being an infinite value.

19. The non-transitory computer-readable storage medium of claim 12, wherein the instructions cause the machine to:
   transition the data field from a modifiable state to an immutable state based upon the data field being populated with the retention end date.

20. The non-transitory computer-readable storage medium of claim 12, wherein the instructions cause the machine to:
   restrict access to modify the event retained data structure except to modify the data field upon occurrence of the event.

* * * * *